US012424397B2

(12) United States Patent
He et al.

(10) Patent No.: US 12,424,397 B2
(45) Date of Patent: Sep. 23, 2025

(54) SWITCH CONTROL PANEL

(71) Applicant: ZHEJIANG XIANGRUI AUTO ELECTRICAL APPLIANCE CO., LTD, Wenzhou (CN)

(72) Inventors: Dewei He, Rui'an (CN); Anqi He, Rui'an (CN); Ziyao He, Rui'an (CN)

(73) Assignee: ZHEJIANG XIANGRUI AUTO ELECTRICAL APPLIANCE CO., LTD, Wenzhou (CN)

( * ) Notice: Subject to any disclaimer, the term of this patent is extended or adjusted under 35 U.S.C. 154(b) by 0 days.

(21) Appl. No.: 18/412,431

(22) Filed: Jan. 12, 2024

(65) Prior Publication Data

US 2025/0182982 A1 Jun. 5, 2025

(30) Foreign Application Priority Data

Dec. 1, 2023 (CN) ......................... 202323281721.8

(51) Int. Cl.
*H01H 13/04* (2006.01)
*H01H 13/14* (2006.01)
*H01H 13/86* (2006.01)

(52) U.S. Cl.
CPC ............ *H01H 13/04* (2013.01); *H01H 13/14* (2013.01); *H01H 13/86* (2013.01)

(58) Field of Classification Search
CPC ........ H01H 13/04; H01H 13/14; H01H 13/86; H01H 3/12; H01H 13/06
See application file for complete search history.

(56) References Cited

U.S. PATENT DOCUMENTS 8,237,072 B2 * 8/2012 Kubota .................. H01H 13/14 200/341
9,487,974 B2 * 11/2016 Saitou ..................... E05B 81/76

FOREIGN PATENT DOCUMENTS

CN 204014220 U 12/2014
CN 112696648 A 4/2021
CN 214064270 U 8/2021

* cited by examiner

*Primary Examiner* — Lheiren Mae A Caroc
(74) *Attorney, Agent, or Firm* — Nitin Kaushik

(57) ABSTRACT

The present invention relates to a switch control panel including a base provided with a mounting cavity provided with an electronic element integrated board, characterized in that the base is sleeved with an upper cover and is in a sealed connection with the upper cover, the upper cover is provided orderly and is provided with a key boss capable of being deformed and reset, each of the key bosses penetrates through the mounting cavity and is provided with a key slot with an opening, one end of the key slot opposite the opening is connected to the mounting cavity and is provided with an interlayer capable of being deformed and reset, and a switch key is embedded between the interlayer and the opening in the key slot to improve the sealing performance and prevent the inside of the mounting cavity from entering water vapor.

11 Claims, 9 Drawing Sheets

SWITCH CONTROL PANEL

CROSS-REFERENCE TO RELATED APPLICATIONS

The application claims priority to Chinese patent application No. 202323281721.8, filed on Dec. 1, 2023, the entire contents of which are incorporated herein by reference.

TECHNICAL FIELD

The present invention relates to the field of automotive switch panels, and in particular to a switch control panel.

BACKGROUND

In vehicle refitting, for example, an off-road vehicle will be refitted with a spotlight which is usually provided with a switch control panel for controlling a switch of the spotlight and mode selection; the existing switch control panel is usually provided with multiple key positions for selecting functions; the switch control panel is usually provided with an upper cover, a base connected to the upper cover and provided with a mounting cavity and an electronic element integrated board provided in the base; the upper cover is provided with a switch key; in the above-mentioned structure, in order to facilitate the pressing of the switch key, the switch key is usually movably provided with the panel so that there is a gap between the switch key and the panel; in addition, the upper cover and the base cover, which are both made of plastic, are usually fixed by means of a screw or rivet connection after being closed, and no sealing treatment is performed at the gap, so that the overall sealing performance of the switch control panel is insufficient; since the driving environment of the off-road vehicle is relatively complicated, when the humidity in the vehicle is too high or even when water enters, water vapor enters the mounting cavity of the switch control panel, causing problems such as short circuit of the electronic element integrated board, and affecting the normal use of the switch control panel.

SUMMARY

The technical problem to be solved by the present invention is to solve the above-mentioned deficiencies of the prior art.

A switch control panel is provided to improve the sealing performance and prevent the inside of mounting cavity from entering water vapor.

In order to achieve the above object, the present invention provides the following technical solutions: a switch control panel comprising a base provided with a mounting cavity provided with an electronic element integrated board, characterized in that the base is sleeved with an upper cover and is in a sealed connection with the upper cover, the upper cover is provided orderly and is provided with a key boss capable of being deformed and reset, each of the key bosses penetrates through the mounting cavity and is provided with a key slot with an opening, one end of the key slot opposite the opening is connected to the mounting cavity and is provided with an interlayer capable of being deformed and reset, and a switch key is embedded between the interlayer and the opening in the key slot.

The present invention having the above-mentioned features: the interlayer eliminates the gap between the switch key and the mounting cavity, and the interlayer and the key boss can be deformed and reset, so that when the switch key is pressed, the interlayer and the key boss are deformed, and the interlayer is deformed to press the switch element provided on the electronic element integrated board, so as to ensure the sealing between the upper cover and the switch key, and at the same time, the normal use of the switch key is maintained, and the base is connected with the upper cover in a sealed manner to entirely seal the switch control panel to ensure its waterproof property.

A further arrangement of the present invention is: the upper cover can be deformed and reset and is provided with a mounting groove adapted to the base, a positioning edge is circumferentially provided around an outer wall of the base, the mounting groove is provided with a positioning groove adapted to the positioning edge along an inner wall of the mounting groove circumferentially, the base is embedded in the mounting groove, and the positioning edge is partially embedded in the positioning groove, a sealing gap is provided between an outer end surface of the base and an inner wall of the mounting groove, and a sealing object is filled in the sealing gap.

A further arrangement of the present invention is: the sealing object is a sealant, and the sealant is poured into the sealing gap and respectively bonded to part of the positioning edge, the inner wall of the mounting groove and the outer end surface of the base after it is solidified.

The present invention having the above-mentioned features: the sealing gap is filled by the sealant, and the gap created by the connection between the base and the upper cover is filled, so that the upper cover and the base are completely sealed to ensure its waterproof property.

A further arrangement of the present invention is: a boss is provided on one end surface of each of the interlayer faces the mounting cavity, and when the interlayer deforms towards the mounting cavity, the boss pushes and presses a switch element provided on the electronic element integrated board.

The present invention having the above-mentioned features: the interlayer is provided with a boss, so that when the switch key is pressed, the switch element provided on an electronic element integrated board is contacted more quickly, the deformation distance of the interlayer is shortened, the interlayer is placed over-deformed, the service life of the interlayer is extended, and at the same time, the pressing is made more labor-saving.

A further arrangement of the present invention is: an end surface of one side of the interlayer opposite to the boss is provided with a plug-in groove, a positioning block adapted to the plug-in groove is provided at the bottom of the switch key, and the positioning block is plug-fitted with the plug-in groove.

The present invention having the above-mentioned features: the plug-in groove and the positioning block cooperate to position the position of the switch key, so as to prevent the switch key from shifting when pressing and affecting the pressing effect.

A further arrangement of the present invention is: a limiting raised edge is provided at an opening of the key slot, a limiting ring is circumferentially provided around the switch key, and when the switch key is placed in the key slot, the top of the limiting ring abuts below the limiting raised edge.

The present invention having the above-mentioned features: the switch key is aligned with an opening of the key slot, the switch key is pressed, the opening of the key boss is deformed, the switch key enters the key slot to complete the mounting of the switch key, the limiting raised edge abutting the limiting ring, and preventing the switch key from exiting the key slot.

A further arrangement of the present invention is: the upper cover, the key boss, the interlayer, the limiting raised edge and the boss are integrally formed, and the upper cover, the key boss, the interlayer, the limiting raised edge and the boss are all rubbers.

The present invention having the above-mentioned features: the upper cover, the key boss, the interlayer, the limiting raised edge and the boss are integrally formed to ensure the integrity of the integral connection, and ensure the waterproofness between the joints of various parts, and at the same time a rubber material is used to further ensure the waterproofness of the whole upper cover.

Advantageous effects of the present invention are: the interlayer eliminates the gap between the switch key and the mounting cavity to ensure the sealing between the upper cover and the switch key; a sealant is poured into the sealing gap, and fills the gap created by the connection between the base and the upper cover, so as to seal the switch control panel as a whole, and ensure the waterproof property thereof, and prevent the water vapor entering into the mounting cavity from affecting the normal operation of the electronic element integrated board.

The present invention will now be described in further detail with reference to the accompanying drawings and examples.

DETAILED DESCRIPTION OF THE EMBODIMENTS

Figure 1A:
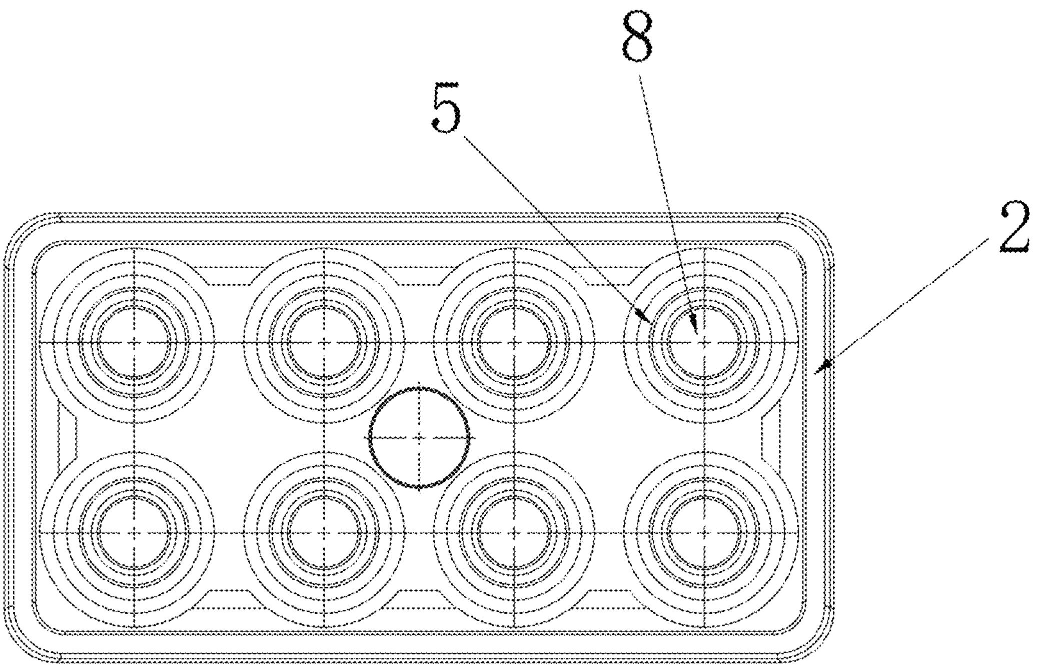
FIG. 1A is a first schematic perspective view according to an embodiment of the present invention.
Figure 1B:
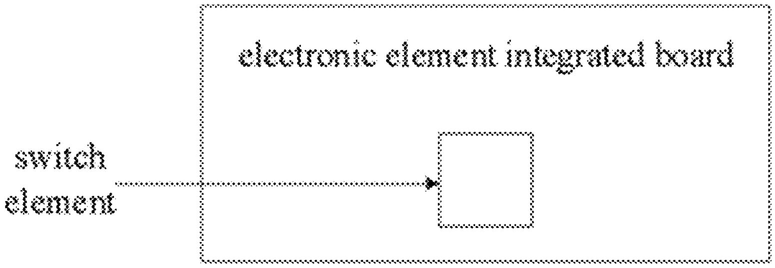
FIG. 1B is a schematic perspective view of an electronic element integrated board according to an embodiment of the present invention.
Figure 2:
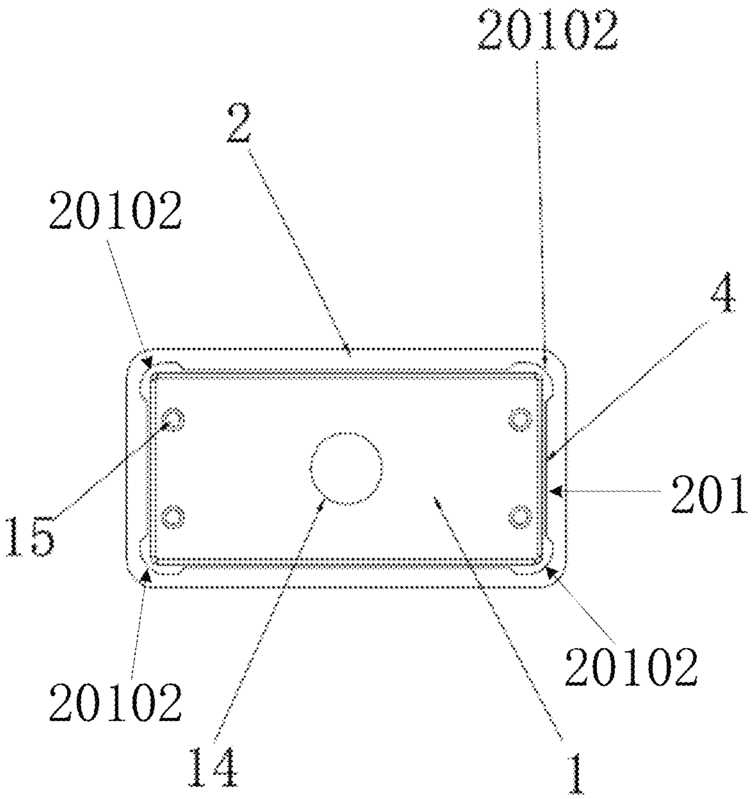
FIG. 2 is a second schematic perspective view according to an embodiment of the present invention.
Figure 3:
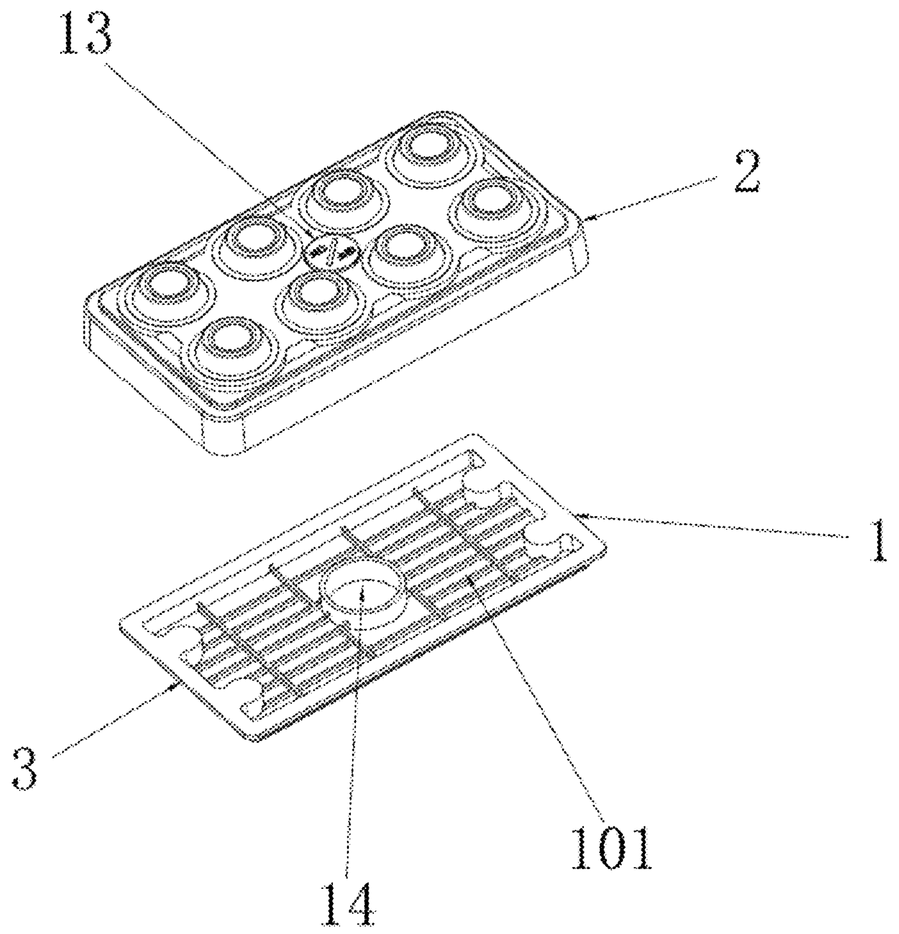
FIG. 3 is an exploded view of a cover and a base according to an embodiment of the present invention.
Figure 4:
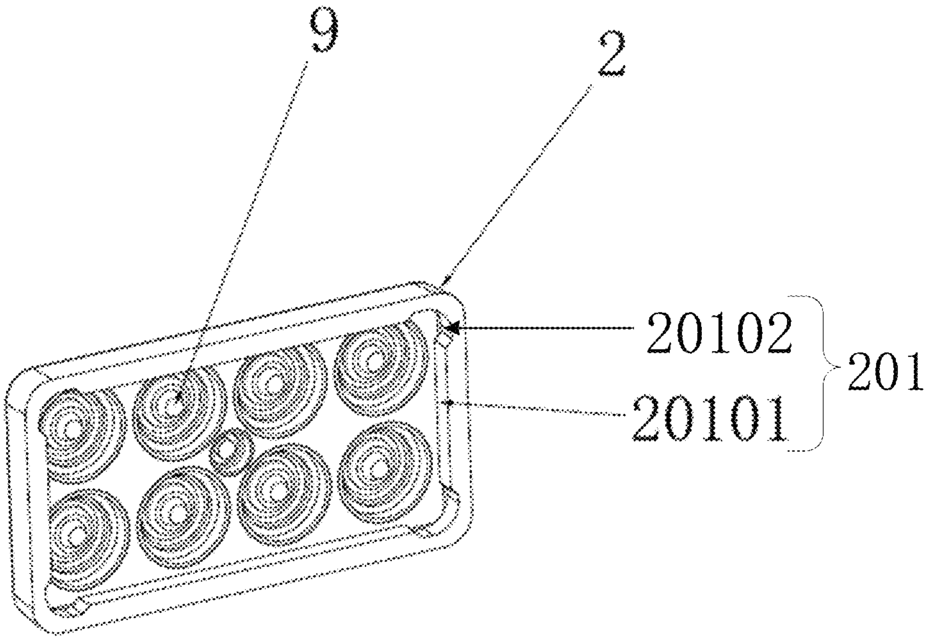
FIG. 4 is a first schematic perspective view of an upper cover according to an embodiment of the present invention.
Figure 5:
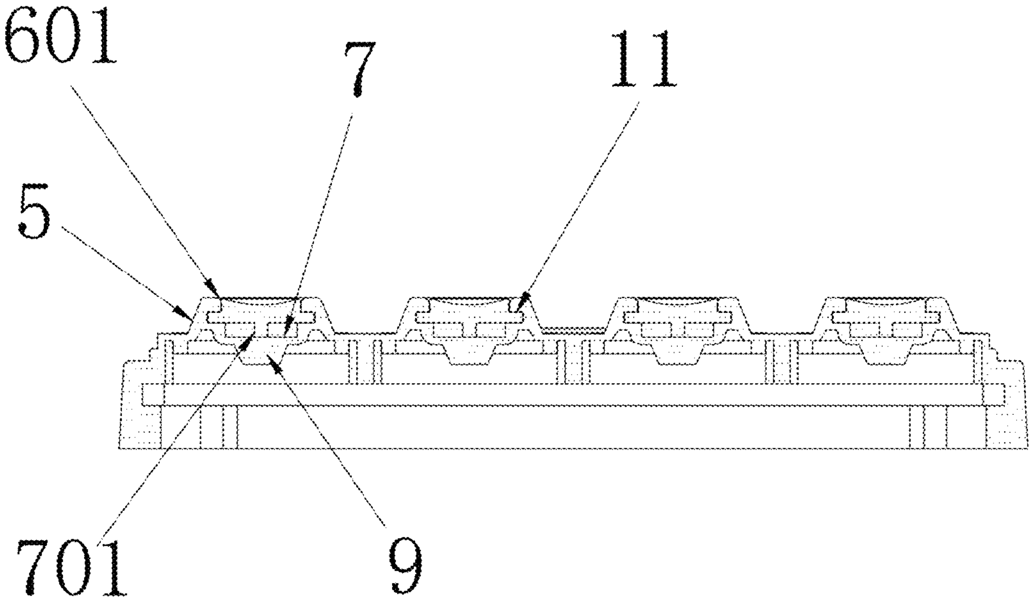
FIG. 5 is a schematic cross-sectional view of an upper cover according to an embodiment of the present invention.
Figure 6:
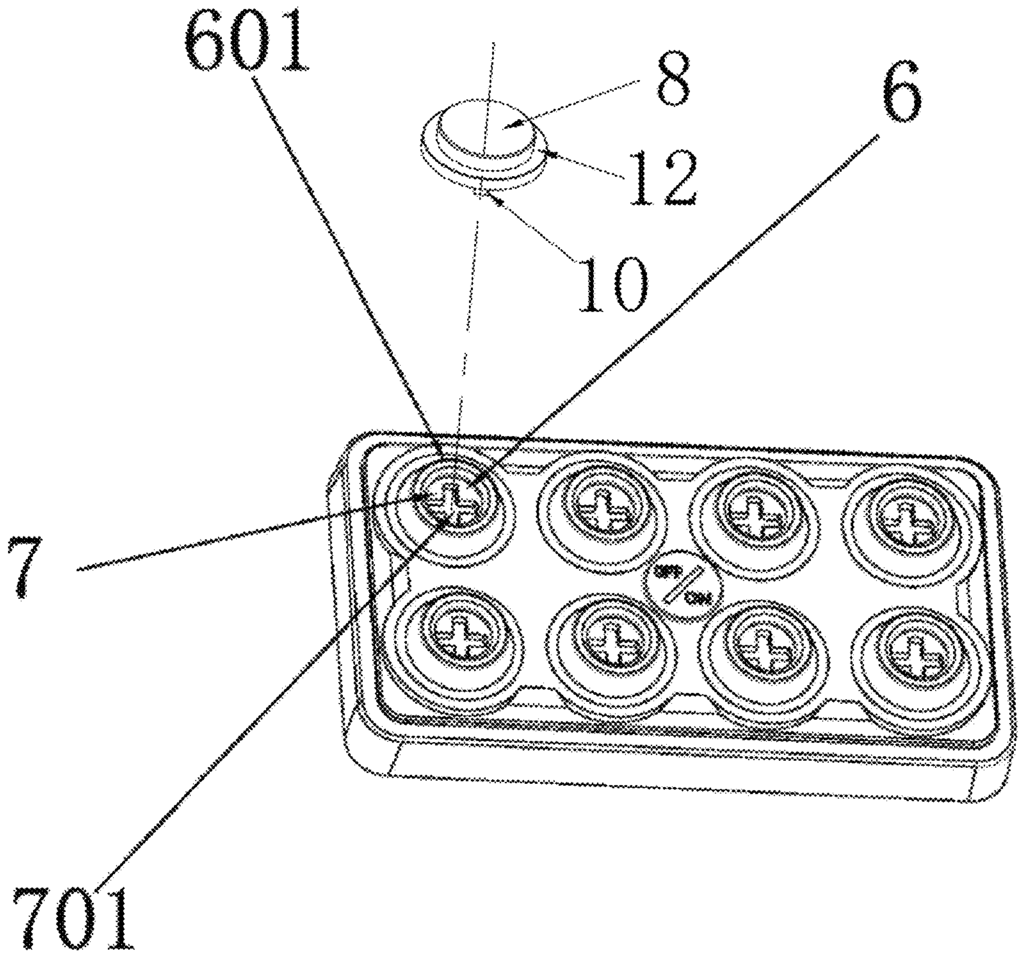
FIG. 6 is a second schematic perspective view of an upper cover according to an embodiment of the present invention.
Figure 7:
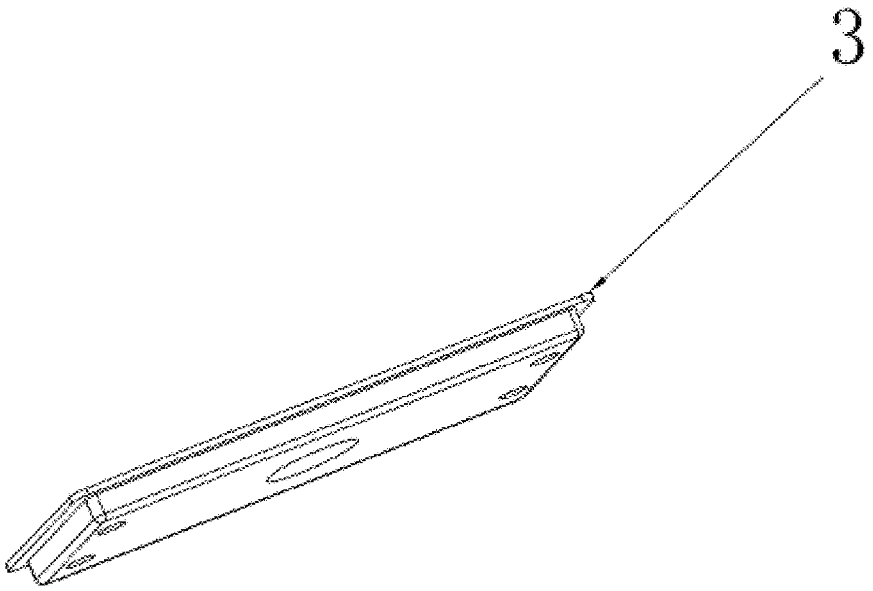
FIG. 7 is a schematic perspective view of a base according to an embodiment of the present invention.
Figure 8:
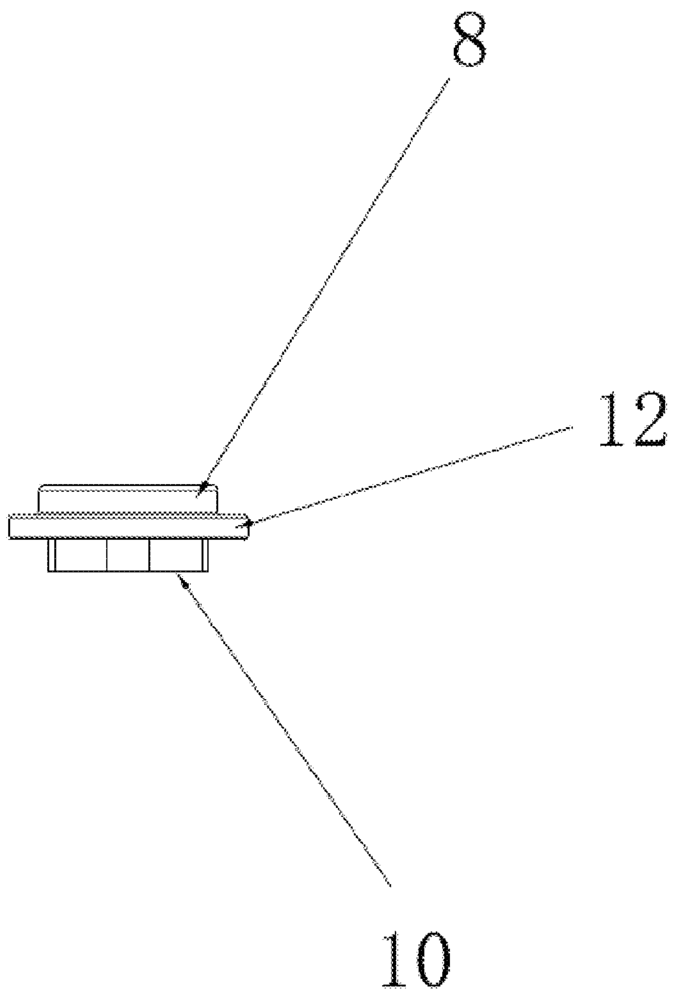
FIG. 8 is a schematic perspective view of a switch key according to an embodiment of the present invention.
Figure 9:
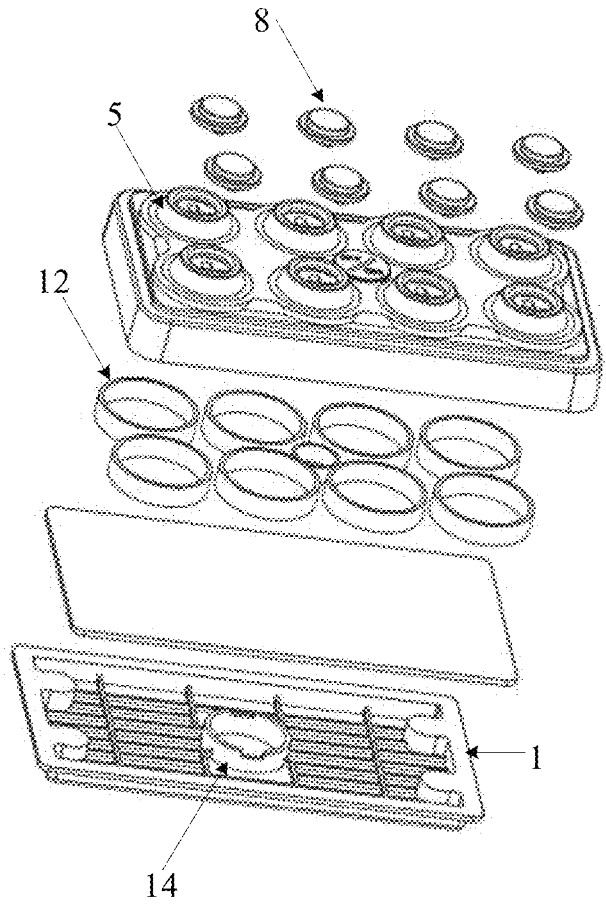
FIG. 9 is an exploded view of the switch control panel.

As shown in FIGS. 1-8, a switch control panel comprises a base 1, wherein the base 1 is provided with a mounting cavity 101 which is provided with an electronic element integrated board (not marked in the figures), wherein the base 1 is sleeved with an upper cover 2 made of rubber, the upper cover 2 is provided with a mounting groove 201 adapted to the base 1, a positioning edge 3 is circumferentially provided around an outer wall of the base 1, the mounting groove 201 is provided with a positioning groove 20101 adapted to the positioning edge 3 along the inner wall of the mounting groove 201, and the base 1 is embedded in the mounting groove 201; and the positioning edge 3 is partially embedded in the positioning groove 20101, a sealing gap 4 is provided between the outer end surface of the base 1 and the inner wall of the mounting groove 201, the sealing gap 4 is filled with a sealant poured into the sealing gap 4, and after the sealant is solidified, the sealant is respectively adhered to the partial positioning edge 3, the inner wall of the mounting groove 201 and the outer end surface of the base 1, in order to facilitate the upper cover 2 being sleeved on the base 1, an arc-shaped groove 20102 is provided at the corner of the inner wall of the mounting groove 201, so that the corner of the positioning edge 3 enters the positioning groove 20101 more easily when being embedded and mounted, the upper cover 2 is sequentially provided with key bosses 5 made of rubber and integrally formed with the upper cover 2; each of the key bosses 5 penetrates into the mounting cavity and is provided with a key slot 6 with an opening 601; one end of the key slot 6 opposite to the opening 601 is connected to the mounting cavity 101 and is provided with a spacer 7 integrally formed with the key boss 5; the spacer 7 is also made of rubber; a switch key 8 is embedded between the spacer 7 and the opening in the key slot 6; and an end surface of one side of each spacer 7 facing the mounting cavity 101 is integrally formed with a boss 9 made of rubber. When the interlayer 7 is deformed towards the mounting cavity 101, the boss 9 pushes and presses a switch element provided on the electronic element integrated board, an end surface of one side of the interlayer 7 opposite to the boss 9 is provided with a plug-in groove 701, a positioning block 10 adapted to the plug-in groove 701 is provided at the bottom of the switch key 8, the positioning block 10 is plug-fitted with the plug-in groove 701, a limiting raised edge 11 integrally formed with the key boss 5 is provided at the opening of the key slot 6, the limiting raised edge 11 is made of rubber, the switch key 8 is circumferentially provided with a limiting ring 12, and when the switch key 8 is placed in the key slot 6, the top of the limiting ring 12 abuts below the limiting raised edge 11.

The upper cover 2 is further provided with a general control switch key, wherein the general control switch key is only provided with a thickened diaphragm 13 made of rubber, the thickened diaphragm 13 is provided to be protruding on one side above the upper cover 2, and an end surface of the thickened diaphragm on the side facing the mounting cavity 101 is also integrally formed with a boss 9.

If the switch control panel is wired to a subsequent device, the base 1 is provided with a wire outlet hole 14, the wire harness extends out of the mounting cavity 101 through the wire outlet hole 14, seals the wire outlet hole 14, and can also be filled with sealant for treatment; the base 1 is further provided with an mounting hole 15 connected to a bracket, and the mounting hole 15 is not in communication with the mounting cavity 101.

If the switch control panel is in wireless connection, the outlet hole 14 and the mounting hole 15 are not provided.

What is claimed is:

1. A switch control panel, comprising a base provided with a mounting cavity provided with an electronic element integrated board, wherein the base is sleeved with an upper cover and is in a sealed connection with the upper cover, the upper cover is provided orderly and is provided with key bosses capable of being deformed and reset, each of the key bosses passes through an opening of a key slot of the mounting cavity, one end of the key slot opposite the opening is connected to the mounting cavity and is provided with an interlayer capable of being deformed and reset, and a switch key is embedded in the key slot and between the interlayer and the opening, and wherein the upper cover can be deformed and reset and is provided with a mounting groove adapted to the base, a positioning edge is circumferentially provided around an outer wall of the base, the mounting groove is provided with a positioning groove adapted to the positioning edge along an inner wall of the mounting groove circumferentially, the base is embedded in the mounting groove, and the positioning edge is partially embedded in the positioning groove, a sealing gap is provided between an outer end surface of the base and an inner wall of the mounting groove, and a sealing object is filled in the sealing gap.

2. A switch control panel according to claim 1, wherein the sealing object is a sealant, and the sealant is poured into the sealing gap and respectively bonded to part of the positioning edge, the inner wall of the mounting groove and the outer end surface of the base after the sealant is solidified.

3. A switch control panel according to claim 1, wherein a boss is provided on one end surface of the interlayer and faces the mounting cavity, and when the interlayer deforms towards the mounting cavity, the boss pushes and presses a switch element provided on the electronic element integrated board.

4. A switch control panel according to claim 3, wherein an end surface of one side of the interlayer opposite to the boss is provided with a plug-in groove, a positioning block adapted to the plug-in groove is provided at a bottom of the switch key, and the positioning block is plug-fitted with the plug-in groove.

5. A switch control panel according to claim 4, wherein a limiting raised edge is provided at the opening of the key slot, a limiting ring is circumferentially provided around the switch key, and when the switch key is placed in the key slot, a top of the limiting ring abuts below the limiting raised edge.

6. A switch control panel according to claim 5, wherein the limiting raised edge is made of rubber and is integrally formed.

7. A switch control panel according to claim 3, wherein the upper cover, the key bosses, the interlayer and the boss are integrally formed, and the upper cover, the key bosses, the interlayer and the boss are all rubber.

8. A switch control panel, comprising a base provided with a mounting cavity provided with an electronic element integrated board, wherein the base is sleeved with an upper cover and is in a sealed connection with the upper cover, the upper cover is provided orderly and is provided with key bosses capable of being deformed and reset, each of the key bosses passes through an opening of a key slot of the mounting cavity, one end of the key slot opposite the opening is connected to the mounting cavity and is provided with an interlayer capable of being deformed and reset, and a switch key is embedded in the key slot between the interlayer and the opening, a boss is provided on one end surface of the interlayer and faces the mounting cavity, and when the interlayer deforms towards the mounting cavity, the boss pushes and presses a switch element provided on the electronic element integrated board, an end surface of one side of the interlayer opposite to the boss is provided with a plug-in groove, a positioning block adapted to the plug-in groove is provided at a bottom of the switch key, and the positioning block is plug-fitted with the plug-in groove, and a limiting raised edge is provided at the opening of the key slot, a limiting ring is circumferentially provided around the switch key, and when the switch key is placed in the key slot, a top of the limiting ring abuts below the limiting raised edge.

9. A switch control panel according to claim 8, wherein the upper cover, the key bosses, the interlayer, the limiting raised edge and the boss are integrally formed, and the upper cover, the key bosses, the interlayer, the limiting raised edge and the boss are all rubber.

10. A switch control panel according to claim 8, wherein the upper cover can be deformed and reset and is provided with a mounting groove adapted to the base, a positioning edge is circumferentially provided around an outer wall of the base, the mounting groove is provided with a positioning groove adapted to the positioning edge along an inner wall of the mounting groove circumferentially, the base is embedded in the mounting groove, and the positioning edge is partially embedded in the positioning groove, a sealing gap is provided between an outer end surface of the base and an inner wall of the mounting groove, and a sealing object is filled in the sealing gap.

11. A switch control panel according to claim 10, wherein the sealing object is a sealant, and the sealant is poured into the sealing gap and respectively bonded to part of the positioning edge, the inner wall of the mounting groove and the outer end surface of the base after the sealant is solidified.

* * * * *